United States Patent
Ganguli et al.

(10) Patent No.: US 6,906,000 B1
(45) Date of Patent: Jun. 14, 2005

(54) STABLE CARBONOUS CATALYST PARTICLES AND METHOD FOR MAKING AND UTILIZING SAME

(75) Inventors: Partha S. Ganguli, Princeton, NJ (US); Alfred G. Comolli, Yardley, PA (US)

(73) Assignee: Hydrocarbon Technologies, Inc., Lawrenceville, NJ (US)

( * ) Notice: Subject to any disclaimer, the term of this patent is extended or adjusted under 35 U.S.C. 154(b) by 0 days.

(21) Appl. No.: 10/014,955

(22) Filed: Dec. 11, 2001

(51) Int. Cl.[7] .......................... B01J 21/18; B01J 23/00; B01J 23/48; B01J 31/00; B32B 15/02
(52) U.S. Cl. ................... 502/180; 502/182; 502/183; 502/184; 502/159; 428/402; 428/403
(58) Field of Search ................ 502/180, 182–184, 502/159; 428/402, 403

(56) References Cited

U.S. PATENT DOCUMENTS

| | | | |
|---|---|---|---|
| 5,037,791 A | | 8/1991 | Comolli et al. ............. 502/185 |
| 5,346,619 A | * | 9/1994 | Funkenbusch et al. ... 210/198.2 |
| 6,054,497 A | * | 4/2000 | Sofianos et al. ............ 517/713 |
| 6,177,596 B1 | * | 1/2001 | Yadav et al. ................ 568/829 |
| 2002/0160196 A1 | * | 10/2002 | Carr et al. ................... 428/407 |

* cited by examiner

Primary Examiner—Mark L. Bell
Assistant Examiner—Patricia L. Hailey
(74) Attorney, Agent, or Firm—Workman Nydegger (57) ABSTRACT

Stable carbonous catalyst particles composed of an inorganic catalytic metal/metal oxide powder and a carbonaceous binder material are formed having a basic inner substantially uniform-porous carbon coating of the catalytic powder, and may include an outer porous carbon coating layer. Suitable inorganic catalytic powders include zinc-chromite ($ZnO/Cr_2O_3$) and suitable carbonaceous liquid binders having molecular weight of 200–700 include partially polymerized furfuryl alcohol, which are mixed together, shaped and carbonized and partially oxidized at elevated temperature. Such stable carbonous catalyst particles such as 0.020–0.100 inch (0.51–2.54 mm) diameter extrudates, have total carbon content of 2–25 wt. % and improved crush strength of 1.0–5 $1b/mn$, 50–300 $m^2/g$ surface area, and can be advantageously utilized in fixed bed or ebullated/fluidized bed reactor operations. This invention also includes method steps for making the stable carbonous catalyst particles having improved particle strength and catalytic activity, and processes for utilizing the active stable carbonous carbon-coated catalysts such as for syn-gas reactions in ebullated/fluidized bed reactors for producing alcohol products and Fischer-Tropsch synthesis liquid products.

14 Claims, 5 Drawing Sheets

STABLE CARBONOUS CATALYST PARTICLES AND METHOD FOR MAKING AND UTILIZING SAME

This invention was made with support under United States Department of Energy Contract No. DE-FG26-99FT 40681, and the U.S. Government has certain rights in this invention.

BACKGROUND OF INVENTION

This invention pertains to stable carbonous catalyst particles having uniform composition of an active inorganic catalytic powder and a carbonous binder material selected for providing a basic inner porous carbon coating bonding the powder, and includes a method for making the carbonous catalyst and utilizing a catalytic process for it in catalytic reactors. Such stable carbonous catalyst particles may also include an outer porous carbon coating. These carbonous catalyst particles have adequate crush strength and attrition resistance, and can be advantageously utilized preferably in ebullated/fluidized bed catalytic reactors for various exothermic process reactions, such as catalytic conversion of synthesis gas feedstreams for producing oxygenated hydrocarbons including alcohol products.

Conventional catalyst particles having outer carbon coating for providing improved particle strength are known. For example, U.S. Pat. No. 5,037,791 to Comolli and Ganguli discloses metal oxide supported porous carbon-coated catalysts and method of making them. Such known carbon coating for porous metal-oxide catalyst particles can provide improved particle strength, reduced attrition loss and improved catalyst performance characteristics. For the Comolli et al patent, the inert support material of alumina, silica, silica-alumina, magnesia, titania and mixtures thereof provide a high surface area substrate for deposition or impregnation of active catalytic metals and their compounds, such as cobalt, chromium, iron, molybdenum, nickel, titanium, tungsten, vanadium, zinc, and combinations thereof. Such inert support materials permit preparation of small diameter (<1/16 inch) catalyst extrudates suitable for use in ebullated/fluidized bed reactor processes. Depending upon the composition, surface area and pore volume of these small diameter supported catalyst extrudates, they can have reasonable attrition resistance and crush strength which are improved by the outer carbon coating.

There are various other important active catalysts which consist of inorganic materials such as active metals and/or metal oxides only, and do not require or utilize high surface area support materials for deposition of the active metal components or promoters onto the support. Instead such active metal/metal oxide catalyst powders inherently have high surface area characteristics, and need not be diluted by provision of any inert high surface area support materials. However, for these active catalyst powders it is either difficult to form stable particle shapes such as extrudates, or the extrudates formed are too weak in crush strength necessary for successful use in ebullated bed or fluidized bed catalytic reactors which are desired in many commercial processes. These deficiencies for such available active catalyst powders have so far prevented commercial preparation of stable catalyst particle shapes such as small diameter extrudates having sufficient strength and attrition resistance for successful use in ebullated, fluidized or slurry bed catalytic operations. For example, cesium-promoted zinc-chromite and cesium-promoted copper-zinc-chromite are known active catalysts for converting synthesis gas feeds of CO and $H_2$ to produce alcohol products. But because these commercial catalyst particles presently have undesirably low crush strength and low attrition resistance, fixed bed type reactors are being necessarily utilized with relatively large size catalyst particles (~¼ inch diameter). Also, ZnO-$Cr_2O_3$ catalyst particles are used for methanol production from synthesis gas feeds, but at present only large size (~¼ inch) catalyst particles are used in fixed bed type reactors. K-and Mn-promoted zirconia powders are also advanced catalysts useful for production of higher alcohols from synthesis gas feeds via exothermic reactions, but these catalyst powders do not allow desirable preparation of small diameter catalyst particles having sufficient crush strength and attrition resistance for successful use in ebullated bed or fluidized bed reactor operations. Because these catalytic reactions for synthesis gas feeds are highly exothermic and only limited heat transfer rates are available in such fixed bed catalytic reactors, conversion rates for the synthesis gas feed is very low and the catalyst deactivates at an undesired rapid rate. However, for such highly exothermic reactions, use of ebullated bed or fluidized bed catalytic reactors would be ideal because of their more efficient internal heat transfer resulting in achieving higher rates of synthesis gas conversion and lower rates of catalyst deactivation. Thus, having highly active smaller size strong catalyst particles such as extrudates which could be successfully utilized in ebullated, fluidized or slurry bed type reactors would be very advantageous and desirable in the chemical processing industry.

Although the stable carbonous inner carbon-coated catalyst particles of this invention can have improved particle strength, they also provide other desirable catalyst characteristics such as low acidity needed in some catalytic processes which can be successfully performed in fixed bed reactors. The basic inner carbon coating of catalyst particles allows protection of the catalyst active sites from deactivation by subsequent deposition of carbon and other catalyst poisons during process operations, because the catalysts having such inner carbon-coated acidic sites are less prone to deactivation by carbon deposition as the coating itself does not have any acidity. Also, microporous structure of the carbon coating itself can be impregnated with catalyst promoters to provide enhanced catalyst activities. These characteristics can make the stable carbonous carbon-coated catalysts suitable for any reactor configuration, including ebullated/fluidized bed and also fixed bed catalytic reactor operations where significant improvement in attrition resistance of the catalyst is not as necessary. Specifically, solid acid catalysts used for alkane isomerization are easily deactivated by carbon deposition during operations. These catalysts can be initially carbon coated to provide smooth operations with insignificant deactivation. Similarly, hydrocracking and hydrotreating catalysts can be carbon coated for smooth long term operations in fixed bed reactors. Also any difficult to form active catalyst powders can be inner carbon coated to form stable carbonous extrudates for use in fixed bed reactor operations. Also with proper carbon coating of catalysts, their attrition resistance can be increased significantly, thereby making them useful in ebullated bed, fluidized bed or slurry bed reactors which are the appropriate reactor systems for exothermic reactions.

SUMMARY OF INVENTION

The present invention provides active stable carbonous catalyst particles composed of an active catalytic powder and a suitable carbonaceous binder material selected for providing an effective basic inner porous carbon coating on the active catalytic powder for bonding together the powder in the carbonous catalyst particles after appropriate calcining and partial oxidation procedures. The active carbonous catalyst particles such as small diameter stable carbonous extrudates have the basic inner bonding carbon-coating carbonized at high temperature suitable for forming graphitic porous carbon surfaces, and having micropores formed therein by subsequent partial oxidation to provide improved catalyst particle strength and catalytic activity. The basic stable carbonous catalyst particles have substantially uniform composition and structure and need not include an inert support material.

Characteristics of the active stable carbonous catalyst particles provided by the inner carbon coating procedures of this invention are dependent upon various parameters, which includes:

(a) physical and chemical properties of the catalytic metal or metal oxide powders (b) physical and chemical properties of the carbonaceous liquid binder materials mixed with the catalytic metal powder (c) volume ratio of catalytic metal powder to liquid binder materials (d) operating conditions used in the carbonous catalyst carbon-coating bonding and partial oxidation procedures.

The carbonous catalyst particle strength is generally directly proportional to the percentage carbon content of the catalyst within the desired ranges for each parameter.

Inorganic catalytic metal/metal oxide powders suitable for this invention include zinc-chromite ($ZnO/Cr_2O_3$), cesium-promoted zinc chromite, copper-promoted zinc chromite, and K- and Mn-promoted zirconia powder, which are uniformly mixed together with a suitable carbonaceous liquid binder. Suitable carbonaceous liquid binders should have molecular weight in range of 200–700 and kinematic viscosity range of 3–22 centistokes (cst) at 100° F. and 2.6–16 cst at 122° F. temperatures. Such liquid binders include partially polymerized furfuryl alcohol, furfuryl alcohol resins, polyvinyl acetate, polyvinyl butates, polyvinyl chlorides, coal-derived hydrocarbon liquids, and waxes from Fischer-Tropsch synthesis process, If desired for providing further improved catalyst particle crush strength and attrition resistance, the carbonous catalyst particles having the basic inner carbon coating may also include at least one secondary outer porous carbon coating or layer. Such an outer carbon coating or layer may be formed by further contacting the basic catalyst particles with additional carbonous liquid binder coating which is carbonized and then partially oxidized similiarly as for the basic inner porous carbon coating for the catalytic powder in the carbonous catalyst particles. Applying such outer secondary carbon coating or coatings to the basic carbonous catalyst particles results in an increased carbon content for the outer portion of the carbonous catalyst particles relative to its inner portion.

The stable carbonous catalyst particles of this invention have a total carbon content of 2–25 wt %, and preferably 3–20 wt %. The catalyst particles should have crush strength at least about about 1.0 lb/mm, and surface area at least about 50 $m^2$ $\mu$g. Usual broad physical characteristics for the carbonous catalyst are 1.2–5.0 lb/mm crush strength, 60–300 $m^2/g$ surface area, and 0.020–0.100 inch (0.51–2.54 mm) diameter particle size. Preferred carbonous catalyst particle characteristics are 1.4–4.5 lb/mm crush strength, 80–200 $m^2/g$ surface area, and 0.025–0.075 inch (0.63–1.90 mm) diameter particle size.

This invention includes methods for making the active stable carbonous catalyst particles, including providing active inorganic metal or metal oxide catalytic powders and mixing with suitable carbonaceous liquid binders and forming such powder-binder mixture into soft self-supporting catalyst particles having 0.020–0.100 inch diameter, then heating the soft catalyst particles for carbonizing and partially oxidizing the carbonaceous liquid binder and thereby producing stable carbonous catalyst particles having the desired basic carbon coating and improved crush strength, attrition resistance and catalytic activity. If desired for providing increased crush strength and attrition resistance for the carbonous catalyst particles, the catalyst particles may have an outer secondary carbon coating or layer applied to the basic carbonous catalyst particles. Such additional coating or layer may be applied by contacting the basic formed carbonous catalyst particles with the carbonaceous liquid binder material, either before or after the heating and carbonizing step for the basic formed catalyst particles. Such additional contacting of the basic carbonous catalyst particles with the carbonaceous liquid binder can be accomplished either by immersing the formed catalyst particles in the liquid binder, or by spraying the liquid binder onto the catalyst particles.

This invention also includes processes for utilizing the stable carbonous catalyst particles of the invention in many commercially important catalytic reactions performed on various feedstreams in either fixed bed or ebullated/fluidized bed type reactors for producing desired chemical products. Such catalytic processes may include catalytically reacting syngas ($H_2$+CO) feedstreams for producing various desired alcohol products, and other similar catalytic processes.

This invention is particularly advantageous for those active catalytic inorganic metal/metal oxide powders which are difficult materials for forming into stable catalyst particle shapes such as extrudates having sufficient particle strength and attrition resistance for successful commercial use in ebullated bed or fluidized bed type catalytic reactors, such as for producing alcohol products from synthesis gas feedstreams and many other catalytic reaction processes.

DESCRIPTION OF INVENTION

According to one embodiment of the present invention, stable small diameter carbonous catalyst particles having basic inner carbon coating containing 2–25 wt. % carbon, surface area of 50–300 $m^2/g$ and 1.0–5 lb/mm crush strength are provided by mixing selected active inorganic catalytic powder, such as metal or metal oxide powders having size smaller than about 200 mesh, together with a suitable carbonaceous liquid binder material having broad molecular weight range of 200–700 and broad kinematic viscosity range of 3–20 centistokes (cst) at 100° F., and 2.6–16 cst at 122° F. temperature and forming small size soft shaped stable particles such as small diameter extrudates having substantially uniform composition. The soft stable carbonous catalyst particles are then heated sufficiently for carbonizing the carbonaceous liquid binder and thereby provide the basic inner carbon coating of the catalytic powder for effectively bonding together the powder in the stable carbonous catalyst particles, followed by subsequent heating and partial oxidation of the basic inner carbon coating to form micropores in the coating. Specifically, the inorganic catalytic powder such as active metal or metal oxides is mixed with sufficient carbonaceous liquid binder material, such as partially polymerized furfuryl alcohol having viscosity of 3–20 centistokes (cst) at 100° F. temperature, and the powder-liquid binder mixture having consistency of a paste is formed into soft self-supporting particle shapes. Such shapes are preferably formed by being extruded through an extruder nozzle having small diameter die holes such as 0.020–0.100 inch diameter to form the soft extrudate shapes having strength suitable for subsequent normal handling. The resulting soft extrudates are heated and carbonized in an inert gas atmosphere at 800° F.–1400° F. temperatures for 14 hours duration for converting the basic carbonaceous liquid binder coating into a graphitic form. The resulting carbon-coated extrudates are next partially oxidized at 700–1000° F. temperature in a gas flow containing 0.1–5 vol % oxygen concentration in nitrogen gas for 1–4 hours to create micropores in the basic graphite coating and thereby provide the desired enhanced surface area and catalytic properties for the stable carbonous catalyst particles. The resulting carbonaceous catalyst particles have good catalytic activity and adequate structural or crush strength necessary for successful extended process operations in ebullated/fluidized bed catalytic reactors.

If desired or needed for providing further improved crush strength for the stable carbonous catalyst particles, they may have an outer carbon coating or layer applied by contacting the carbonous catalyst particles with the same or another suitable carbonaceous liquid binder material, such as by a dipping or spraying step, followed by high temperature heating and carbonization to form a graphitic outer coating or layer on the particles, then followed by a further partial oxidation step to form a porous outer surface on the carbonous catalyst particles.

The carbonous carbon-coated catalyst technology of this invention can be utilized for making catalyst particles suitable for use in many different catalytic reaction processes, and particularly carbonous catalyst particles having desired improved crush strength and attrition resistance for advantageous use in ebullated/fluidized bed type reactors, wherein the catalyst particles provide high internal heat transfer, high catalytic conversion rates and long catalyst life. The stable carbonous carbon-coated catalyst particles of this invention have wide utility, particularly in those catalytic reaction processes which are highly exothermic and can advantageously utilize upflow ebullated/fluidized bed type reactors which have high fluid velocities and vigorous random movements of the catalyst particles in the reactor bed. Such catalytic processes include but are not limited to conversion of syngas ($CO+H_2$) feedstreams to produce various alcohol products, Such catalytic reaction processes utilizing the stable carbonous carbon-coated catalyst particles of this invention are generally depicted by FIG. 1.

Figure 1:
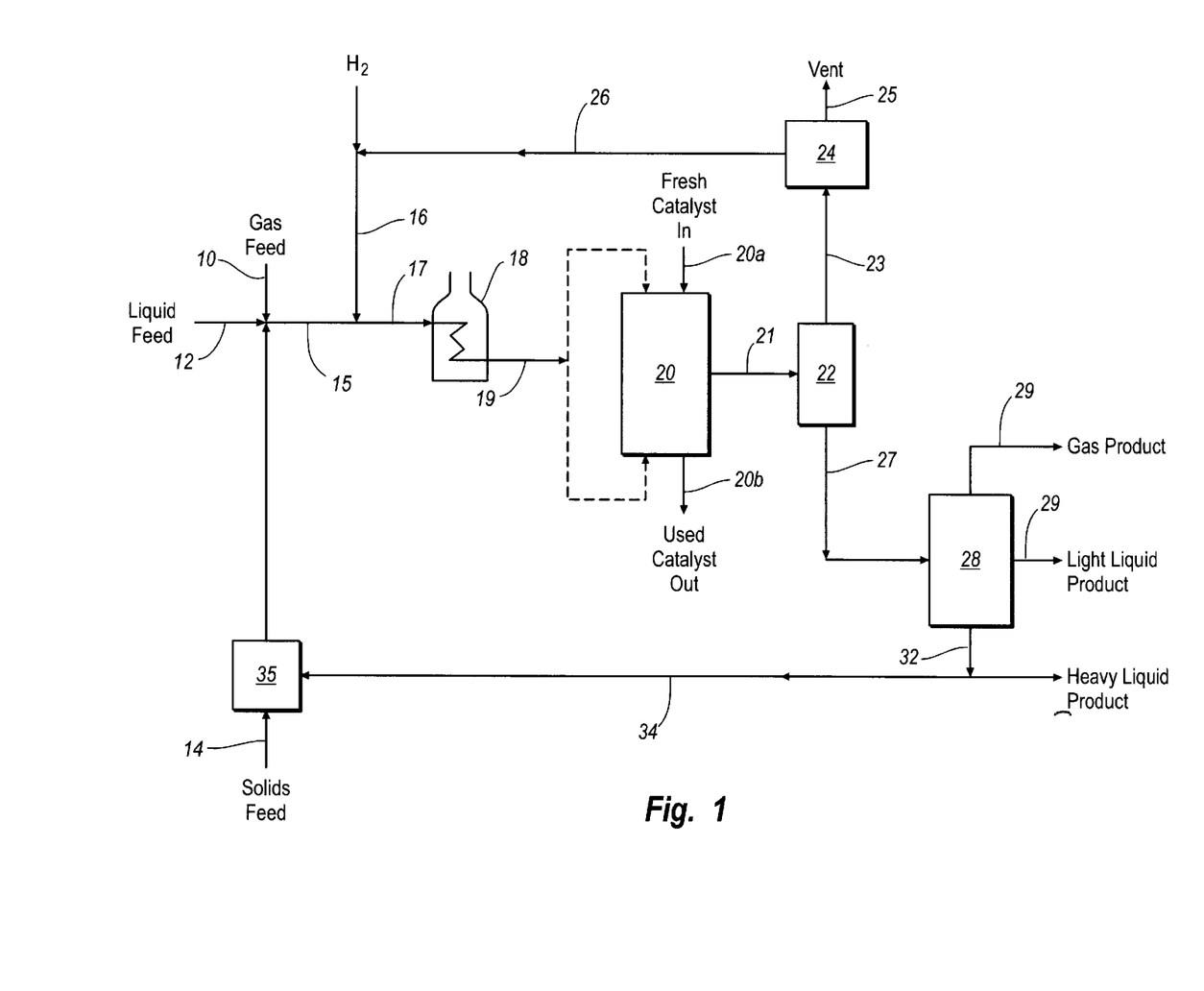
FIG. 1 is a general process flowsheet utilizing either a downflow fixed bed or upflow ebullated bed type catalytic reactor for catalytic reaction processes, such as for syngas feedstream conversions for producing alcohols and Fischer-Tropsch liquid products.

As shown by FIG. 1, the feedstream to the process can be gaseous, liquid, or a solids-containing slurry. A desired feed gas is provided at 10, a hydrocarbon liquid feed provided at 12, and/or a solids feed such as particulate coal provided at 14 and slurried with an oil. The resulting feedstream at 15 is pressurized to desired reaction pressure, hydrogen may be added at 16 and the combined stream 17 is heated at 18, and then fed as stream 19 into catalytic reactor 20. The reactor 20 may contain a fixed bed of the carbonous catalyst particles for which the stream 19 would be passed downflowly through the catalyst bed. Alternatively, the reactor 20 could contain an ebullated bed or slurry bed of carbonous catalyst and the stream 19 would be passed upwardly through the expanded or fluidized catalyst bed. For a particulate solids feed 14, the reactor 20 would preferably be an upflow ebullated bed type reactor, for which fresh carbonous catalyst particles would be injected at upper connection 20$a$ and used catalyst particles removed at lower connection 20$b$ as needed to maintain desired activity of the catalyst bed.

From the reactor 20, effluent stream 21 is passed to hot phase separator 22. A vapor stream is removed overhead at 23 and passed to purification section 24, from which undesired vapors are vented at 25 and recovered reactant gas such as hydrogen is recycled as stream 26. Also from the separator 22, a liquid fraction is withdrawn at 27 and passed to distillation section 28, from which a gas product is removed at 29, and a light liquid product is withdrawn at 30. A heavy liquid product is withdrawn at 32, and a heavy liquid portion 34 is usually recycled to provide the slurrying oil needed at solids slurrying step 35 for the particulate solids feed 14.

For catalytic converison process for syngas ($CO+H_2$) feedstreams for producing alcohol products such as $C_2$–$C_6$ alcohols, useful reaction conditions are 600–900° F. temperature, 1000–2200 psig pressure and 500–10,000 liter feed/kg. cat/hr space velocity. Both light liquid fractions and heavy liquid fractions are withdrawn from the process, and a light liquid fraction can be recycled back to the reactor if desired. Preferred reaction conditions are 620–850° F. temperature, 1200–2000 psig pressure, and 2000–8000 literl/kg. cat/hr space velocity.

This invention will be disclosed further by the following examples of stable carbonous catalyst particles such as extrudates, method steps utilized for making the catalyst including the basic inner and outer secondary carbon coating of the stable carbonous catalyst particles, and catalytic process runs utilizing the stable carbonous catalyst particles for producing alcohol products from syngas ($CO+H_2$) feedstreams.

EXAMPLE 1

Several batches of zinc-chromite catalyst powder having $ZnO/Cr_2O_3$ weight ratio of 3/1 were prepared. An aqueous solution of zinc nitrate and chromium nitrate was poured slowly into an aqueous solution of $K_2CO_3$ and KOH (pH= 10) while stirring. The resulting precipitated material was heated to 70° C. and stirred for 3 hours; then filtered and rinsed three times with de-ionized water. The remaining product was dried at 100° C. in a vacuum oven and analyzed to ensure that the K level is <300 ppm. The dried powder was then calcined at 325° C. in air for 2–3 hours. The yield of catalyst powder was 70–90 wt %, and the BET surface area of the catalyst powder was in the range of 110–140 $m^2$/gm. This zinc-chromite catalyst powder was suitable for making into a synthesized active stable carbon-coated catalyst.

EXAMPLE 2

Zinc-chromite ($ZnO/Cr_2O_3$ having weight ratio of 3/1 and BET surface area of 100–140 $m^2$/g) catalyst powder sample was ground to −200 mesh size and mixed with partially polymerized furfuryl alcohol liquid binder to form a paste having suitable consistency for successful extrusion through a nozzle. The partially polymerized furfuryl alcohol (PPFA) was prepared by heating the alcohol at its boiling point for 4 to 8 hours, utilizing a 500 c.c. flask attached to a reflux condenser. The viscosity representing the degree of polymerization of the furfuryl alcohol increases with increased polyymerization time at its boiling point temperature as follows:

| Polymerization time, hr | 4 | 6 | 8 |
|---|---|---|---|
| Viscosity (CST) | | | |
| @ 100° F. | 3.55 | 4.05 | 4.27 |
| @ 122° F. | 2.59 | 2.87 | 2.89 |

For preparing a polymer binder having only a moderate degree of polmerization (MPFA), furfuryl alcohol with 0.3 to 0.5 v % concentrated sulfuric acid was heated at 70–80° C. for 5–6 minutes with constant stirring. For preparing the carbonous catalyst extrudates, finely ground catalyst powder was thoroughly mixed with 20–35 w % liquid binder agent to obtain a paste having consistency suitable for extrusion. The paste material was extruded through a nozzle sized to prepare soft extrudates having 0.7 mm (0.028 inch) diameter and which were sufficiently dry to be self-supporting. The soft extrudates were carbonized at 1100–1350° F. temperature for 2 hours, and then were partially oxidized at 750–850° F. for one hour. Whenever the basic carbonized extrudates had undesired low crush strength below about 1.0 lb/mm and to provide increased crush strength, a second coating of partially polymerized furfuryl alcohol was applied on the extrudates by soaking, followed by a second carbonization and partial oxidation procedure. The physical characteristics of these stable carbonous catalyst extrudates are presented in Table 1.

TABLE 1

Carbonous Zinc-Chromite Catalyst Extrudates

| Sample No. | Total Carbon Content, Wt % | Crush Strength, Lb/mm | Surface Area, M²/gm |
|---|---|---|---|
| RCZnCr-050900 | | 2.37 | |
| RCZnCr-050900A | | 3.26 | 131.3 |
| RCZnCr-051500A | 3.49 | 1.45 | 76.7 |
| RCZnCr-051500AR* | 4.73 | 3.96 | 73.5 |
| RCZnCr-053100 | 5.42 | 2.12 | — |
| RCZnCr-061600 | — | 3.08 | 84.6 |

*Includes second coating of binder material

The above results show that by adjusting the catalyst carbon coating processing conditions, 0.7 mm diameter basic carbonous carbon-coated catalyst extrudates were made having suitable crush strength exceedubg 1.0 lb/mm and surface area exceeding 50 m²/gm for use in ebullated/fluidized bed reactors, and that a second coating provides increased crush strength if desired.

EXAMPLE 3

Synthesized zinc-chromite catalyst powder from Example 1 was mixed with sufficient partially polymerized furfuryl alcohol liquid binder and subjected to the extrusion, carbonizing and partial oxidation processing steps as in Example 2 to prepare other 0.7 mm diameter carbonous catalyst extrudates. Characteristics of the resulting carbon-coated extrudates are presented below in Table 2:

TABLE 2

Carbonous Zinc-Chromite Catalyst Extrudates

| Sample No. | Total Carbon Content, Wt % | Crush Strength, Lb/mm | Surface Area, M²/gm |
|---|---|---|---|
| CZnCr-021800 | 3.1 | 1.1 | |
| CZnCr-050400 | | 2.6 | |
| CZnCr-050400A* | | 3.4 | 68.2 |
| CZnCr-061900 | 7.1 | 2.5 | 69.2 |

*CZnCr-050400A extrudate sample has second carbon-coating of sample CZnCr-050400.

It is noted that although the crush strengths and surface area values for the basic carbonous catalyst extrudates prepared from the synthesized zinc-chromite powder were somewhat less than for Example No. 2, adequate particle crush strengths exceeding 1.0 lb/mm and surface areas exceeding 60 m²/gm were achieved.

EXAMPLE 4

A laboratory scale cold-flow ebullated bed reactor (0.5 inch inside diameter) was utilized to determine attrition resistance of the carbonous carbon-coated catalyst particles. Two batches of 0.7 mm diameter carbonous zinc-chromite catalyst extrudates were prepared by extrusion of the synthesized zinc-chromite powder of Example 1 mixed with the partially polymerized furfuryl _alcohol binder to form soft extrudates, followed by carbonizing and partial oxidation steps for the basic carbon coating. Properties of these extrudates are presented in Table 3.

TABLE 3

Carbonous Zinc-Chromite Catalyst Extrudates

| Sample No. | Total Carbon Content, Wt % | Crush Strength, Lb/mm | Surface Area, M²/gm |
|---|---|---|---|
| RCZnCr-050400 | 5.42 | 2.63 | 68.19 |
| RCZnCr-051500 | 3.49 | 1.46 | 76.74 |
| Zinc-Chromite Powder | 0.0 | — | 69.9 |

The carbonous extrudates having low crush strength of 1.46 lb/mm were selected for the cold-flow ebullated bed testing, with the assumption that the basic inner carbon coating would provide adequate crush strength and protection against attrition loss during cold flow test operations. Heptane was fed upwardly into the cold flow reactor as the liquid medium, and air was blown into the reactor bottom to achieve 30–35% expansion and ebullation of the catalyst bed following a standard test procedure. After a run conducted for 15 days, the recovered solvent-free carbonous catalyst extrudates were measured for weight and volume, which were the same as for the initial carbonous catalyst particles. According to these cold-flow ebullated-bed test results, attrition loss was essentially zero for the carbonous zinc-chromite extrudates having 1.46 lb/mm crush strength. Because for successful commercial ebullated bed reactor operations for the catalyst the attrition loss must be less than about 5 wt %, it is apparent that particle crush strengths exceeding about 1.0 lb/mm would be suitable for extended usage.

EXAMPLE 5

Because cold-flow ebullated-bed reactor testing of the carbonous carbon-coated zinc-chromite catalyst showed no attrition loss in the Example 4 cold flow reactor run, another batch of carbonous carbon-coated zinc-chromite catalyst extrudates was prepared for an accelerated more severe attrition loss study using a rotating drum test, which is an adaptation of ASTM D4058 method. The drum containing the carbon-coated catalyst extrudates was rotated at 60 rpm for 7.25 hours. Based on this test, a catalyst is considered suitable for ebullated/fluidized bed reactor operations if the attrition loss is less than 5 wt %, with the attrition loss being determined by the percentage of catalyst particles having size smaller than +20 mesh. Characteristics of the carbonous zinc chromite catalyst extrudates from this rotating drum test are presented in Table 4:

TABLE 4

Carbonous Carbon-Coated Catalyst Extrudates After Rotating Drum Test

| Sample No. | Carbon Content, Wt % | Crush Strength, Lb/mm | Surface Area, $m^2/gm$ | Drum Attrition Test Loss, wt. % |
|---|---|---|---|---|
| CZnCr-061900 | 7.1 | 2.5 | 69.2 | 1.45 |

Because the carbonous zinc-chromite catalyst extrudates had an attrition loss of only 1.45 wt % in the rotating drum attrition test, this result indicates that even under severe conditions in ebullated/fluidized bed reactor operations, attrition loss of the carbonous catalyst particles of this invention will be acceptably low.

EXAMPLE 6

Samples of an advanced K- and Mn-promoted $ZrO_2$ catalyst were prepared by a co-precipitation method. Aqueous solution of $ZrOCl_2$, $Mn(NO_3)_2$ and 3.5M ammonium hydroxide were concurrently added with continuous stirring into a container at 50° C. temperature while keeping the solution pH at ~9. The resulting gel precipitate was filtered and washed with de-ionized water, and the gel was dried at 120° C. in a vacuum oven for 4 hours. The dried gel was calcined at 600° C. for 5 hours. Potassium carbonate (2% based on $K_2O$) was impregnated into the calcined powder, dried, and calcined again at 600° C. for 5 hours. BET surface area of the catalyst powder was ~300 $m^2/gm$.

For carbon coating of the Mn-and K-promoted $ZrO_2$ catalyst powder, partially polymerized furfural alcohol with moderate degree of polymerization was obtained by adding 0.3 to 0.5 cc of concentrated $H_2SO_4$ into 100 c.c. of furfuryl alcohol and heating at 70–80° C. for 5–6 minutes with stirring. Extrusion of the K-Mn promoted $ZrO_2$ catalyst powder mixed with moderately polymerized furfuryl alcohol and subsequent basic carbon coating of the extrudates resulted in carbonous catalyst extrudates having 0.7 mm diameter and sufficient crush strength and surface area as presented below in Table 5:

TABLE 5

Carbonous Carbon-Coated Mn-and K-promoted Zinc Oxide Catalysts

| Sample No. | Total Carbon Content, Wt % | Crush Strength, Lb/mm | Surface Area, $m^2/gm$ |
|---|---|---|---|
| CKZrMnO$_x$-090800 | 14.35 | 2.2 | 91.9 |
| CKZrMnO$_x$-091900 | 19.84 | 3.1 | 72.9 |
| CKZrMnO$_x$-092200 |  | 2.6 | 60.8 |
| CKZrMnO$_x$-092500 |  | 3.6 |  |

The above results show that carbon coated K- and Mn promoted $ZrO_2$ catalyst extrudates can be prepared having sufficient crush strength and surface area. Based on these results, it is apparent that the carbonous catalyst particles of zinc-chromite catalyst and K- and Mn promoted $ZrO_2$ advanced catalyst made by mixing the metal powder with a suitable liquid binder followed by extruding and carbonizing steps provide high attrition resistance, and the particles are suitable for use in ebullated/fluidized bed reactor operations.

EXAMPLE 7

Figure 2:
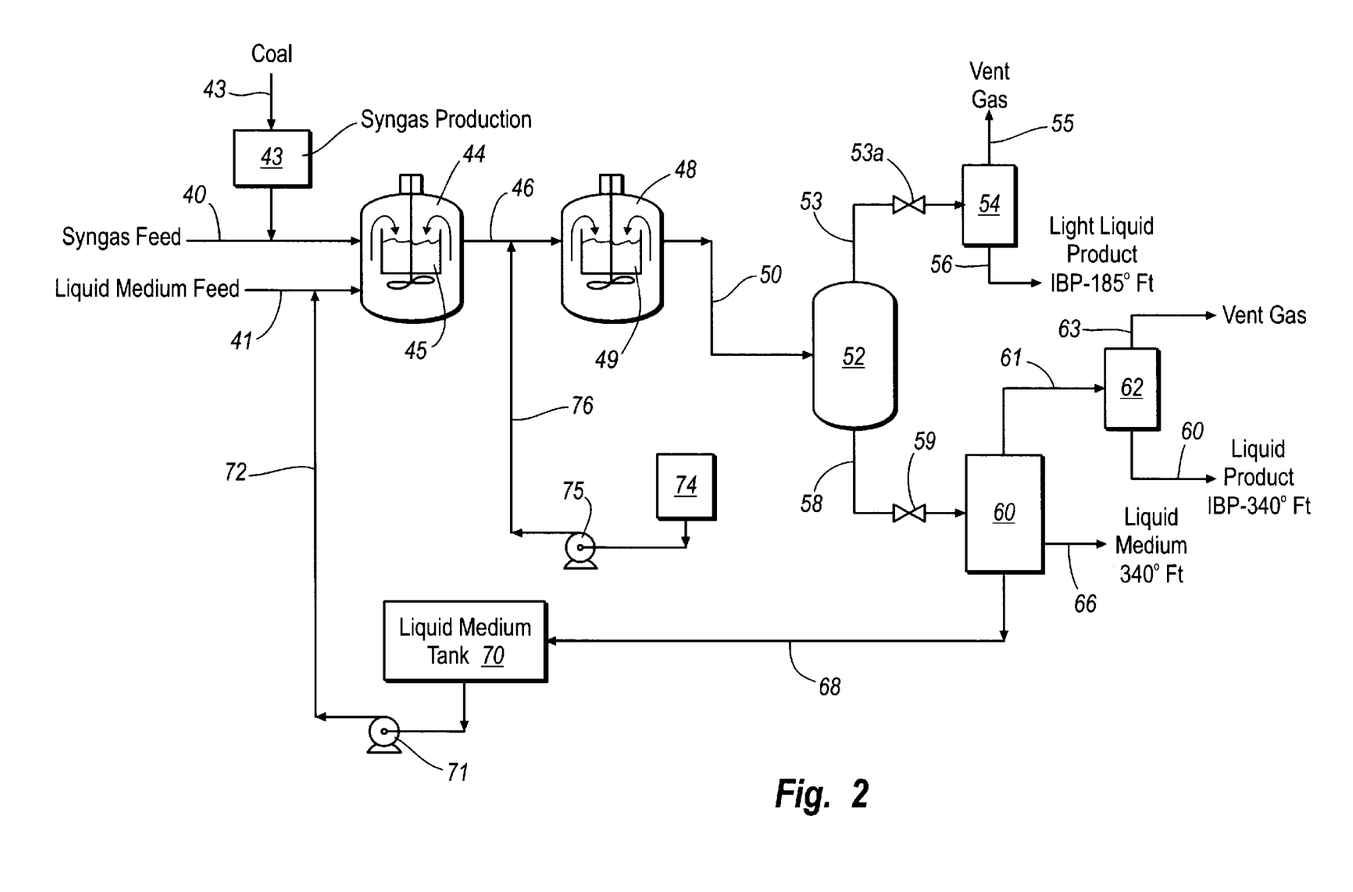
FIG. 2 depicts a simplified flowsheet for a small scale two-stage catalytic reaction process for producing alcohol products from syngas feedstreams.

Carbonous catalyst activity testing was performed using a two-stage Robinson Mahoney reactor system consisting of two series-connected stirred 1-liter autoclave reactors each with a catalyst basket, so that the mechanical stirring maintained the liquid flow in each reactor, as depicted for the FIG. 2 process flowsheet. The catalyst basket in each reactor was initially charged with 100 gms of carbonous carbon-coated Cs-promoted zinc-chromite ($CsZnOCr_2O_3$) catalyst having 3.1 wt % carbon, 2.14 lb/mm crush strength, and 70.4 $m^2/gm$ surface area. Synthesis gas having $H_2/CO$ ratio of 0.75 and 5 vol % $CO_2$ was used as the feedstream. Decalin (b.p. 374° F.) and tetraethylene glycol (b.p. 597° F.) were each used as the main liquid medium feed. A catalytic reaction run was conducted for 120 hours duration with two different reactor space velocities at conditions of 1500 psig pressure, 650–700° F. temperature in the first stage reactor and at higher 700–790° F. temperature in the second stage reactor, and various alcohol products were produced. A process flowsheet of the reactor system used for the experimental catalyst activity test run is provided in FIG. 2. As shown by FIG. 2, the pressurized syngas feedstream including hydrogen ($H_2$) and carbon monoxide (CO) was provided at 40 and fed together with a liquid medium 41 into a first catalytic reactor 44. If desired, such syngas feed can be produced by gasification of coal 42 at gasifier 43. The first reactor 44 contained a stationary bed of carbon coated catalyst 45 through which the liquid medium was circulated by a suitable pumping arrangement. From first catalytic reactor 44, the liquid medium was passed at 46 to a second catalytic reactor 48, which contained a stationary bed of catalyst 49 and had a liquid circulation arrangement similar to that for first reactor 44.

Following the catalytic conversion reactions in second reactor 48, effluent stream 50 containing gas and liquid fractions was passed to hot separator 52, from which a vapor stream 53 was removed, pressure-reduced at 53a, and passed to cold separator 54. From separator 54, a vapor vent stream 55 was removed, and light liquid product 56 was withdrawn having normal boiling range of IBP-185° F. Also from the hot separator 52, a liquid fraction 58 was withdrawn, pressure-reduced at 59, and passed to cold separator 60. From separator 60, a vapor fraction 61 was removed and passed to second separator 62, from which vent gas was removed at 63 and a product liquid stream 64 having normal boiling range IBP-340° F. was withdrawn. Also from the cold separator 60, a 340° F.+ heavy liquid medium was withdrawn at 66. The remaining liquid medium 68 from cold separator 60 was recycled to a holding tank 70, from which it was repressured by pump 71 and joined the liquid medium feed at 41. Because of the small scale of the FIG. 2 experimental catalytic reaction process for producing alcohol products from synthesis gas ($H_2$+CO) feed, it was necessary to introduce a supplemental alcohol stream at 76 from tank 74 into stream 46 upstream of the second stage catalytic reactor 48 to stimulate commercial scale operations.

The catalyst activity test run was started using the carbonous carbon-coated Cs-promoted zinc chromite catalyst extrudates and decalin as the liquid medium. The auxiliary liquid (provided at tank 74) was a mixture of 85 wt % methanol, 5 wt % ethanol and 10 wt % propanol. The operating conditions and preliminary results of the run are presented in Table 6 and Table 6A below.

Preliminary results show that CO conversion was approximately 13–14 vol % at a higher rate of feed gas (GHSV 2010 liter/kg catalyst/hr), and CO conversion of 30 vol % at lower rate of feed gas (GHSV 1260 liter/kg catalyst/hr). Analysis of the light liquid product at stream 56 and heavy liquid product at stream 66 are presented in the Tables 6 and 6A. For the run final period 5B, the elemental analysis shows the presence of desired oxygenated hydrocarbon products.

TABLE 6

Carbonous Catalyst Activity Testing for Cs-Promoted Carbon-Coated Catalyst in Each Reactor

| Run 245-59, Period No. | 1A | 1B | 2A | 2B |
|---|---|---|---|---|
| Reactor Pressure, psig | 1500 | 1500 | 1500 | 1500 |
| First Reactor Temperature, ° F. | 730 | 730 | 715 | 650 |
| Second Reactor Temperature, ° F. | 790 | 790 | 750 | 680 |
| $CO/CO_2$ Inlet Gas Rate, SCFH | 8.3 | 8.3 | 8.3 | 8.3 |
| $H_2$ Inlet Gas Rate, SCFH | 5.9 | 5.9 | 5.9 | 5.9 |
| Inlet $H_2/CO/CO_2$ Rate, GHSV (l/Kg.Cat/hr) | 2010 | 2010 | 2010 | 2010 |
| Main Liquid Medium (Decalin) Recycle, Gm/Hr | 100 | 100 | 100 | 100 |
| Auxiliary Liquid Feed Rate to Second Reactor, Gm/Hr | | 48 | 24 | 24 |
| Light Liquid Product, Gm/Hr | | 60.4 | 26.5 | 25.7 |
| Heavy Liquid Product, Gm/Hr | | 78.5 | 40.8 | 7.7 |
| CO Conversion, vol % | | 12.95 | 13.45 | |
| Gaseous products: | | | | |
| $C_1$–$C_3$, vol. % | | | 0.5 | 0.5 |
| $C_4$–$C_7$, vol. % | | | 0.09 | 0.06 |
| Light Liquid Product Analyses: | | | | |
| Carbon, wt. % | | | 45.9 | 46.06 |
| Hydrogen, wt. % | | | 12.77 | 11.6 |
| Oxygen (By Difference), wt. % | | | 41.33 | 42.36 |
| IBP-185° F., v % | | | — | — |
| 185–250° F., v % | | | — | — |
| 250° F.+, v % | | | — | — |
| Heavy Oil Liquid Product Analyses: | | | | |
| Carbon, wt. % | | | 86.29 | 86.42 |
| Hydrogen, wt % | | | 13.71 | 13.58 |
| Oxygen (By Difference), wt % | | | 0 | 0 |
| IBP-250° F., v % | | | — | — |
| 250–340° F., v % | | | — | — |
| 340° F.+, v % | | | — | — |

TABLE 6A

Carbonous Catalyst Activity Testing For Cs-Promoted Carbon-Coated Catalyst in Each Reactor

| Run 245-59, Period No. | 3A | 3B | 4A | 4B | 5A | 5B |
|---|---|---|---|---|---|---|
| Reactor Pressure, psig | 1500 | 1500 | 1500 | 1500 | 1500 | 1500 |
| First Reactor Temperature, ° F. | 681 | 679 | 688 | 700 | 700 | 700 |
| Second Reactor Temperature, ° F. | 693 | 696 | 718 | 738 | 739 | 739 |
| $CO/CO_2$ Inlet Gas Rate, SCFH | 8.26 | 8.26 | 8.26 | 8.26 | 4.13 | 4.13 |
| $H_2$ Inlet Gas Rate, SCFH | 5.94 | 5.94 | 5.94 | 5.94 | 2.97 | 2.97 |
| Inlet $H_2/CO/CO_2$ Rate, GHSV(l/kg.cat/hr) | 2010 | 2010 | 2010 | 2010 | 1005 | 1005 |
| Liquid Medium (Tetraethylene Glycol) Recycle, Gm/Hr | 50 | 50 | 50 | 50 | 50 | 50 |
| Auxiliary Liquid Feed Rate to Second Reactor, Gm/Hr | 0 | 0 | 24 | 24 | 7 | 0 |
| Light Liquid Product, Gm/Hr | 37.8 | 36.9 | 56.4 | 51.9 | 28.5 | 28.4 |
| Heavy Liquid Product, Gm/Hr | 29.4 | 16.6 | 9.1 | 3.8 | 4.9 | 7.8 |
| CO Conversion, vol % | | 14.26 | | 13.8 | | 30.47 |
| Gaseous products: | | | | | | |
| $C_1$–$C_3$, vol. % | | 0.34 | | 0.58 | | 0.66 |
| $C_4$–$C_7$, vol. % | | 0.57 | | 0.19 | | 0.38 |
| Light Liquid Product Analyses: | | | | | | |
| Carbon, wt. % | | 49.78 | | 50.55 | | 52.16 |
| Hydrogen, wt. % | | 11.17 | | 11.42 | | 11.24 |
| Oxygen (By Difference), wt. % | | 39.05 | | 38.03 | | 36.6 |
| IBP-185° F., v % | | — | | — | | 71 |
| 185–250° F., v % | | — | | — | | 24 |
| 250° F.+, v % | | — | | — | | 5 |
| Heavy Liquid Product Analyses: | | | | | | |
| Carbon, wt. % | | 49.93 | | 65.23 | | 54.78 |
| Hydrogen, wt % | | 10.66 | | 11.61 | | 11.69 |
| Oxygen (By Difference), wt % | | 40.41 | | 23.21 | | 33.53 |
| IBP-250° F., v % | | — | | — | | 62 |
| 250–340° F., v % | | — | | — | | 36 |
| 340° F.+, v % | | — | | — | | 2 |

Figure 3:
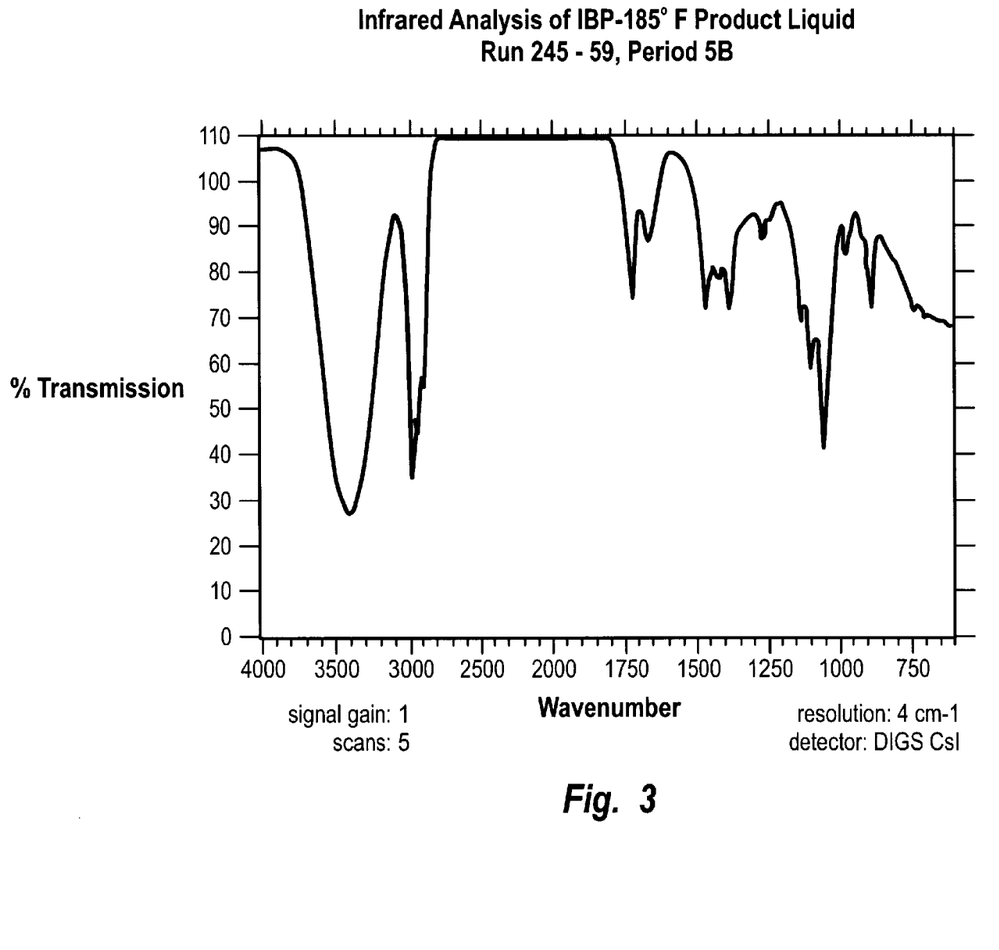
FIGS. 3, 4 and 5 show infrared analysis of various alcohol products produced from experimental process runs made using a stable carbonous carbon-coated catalyst particles and synthesis gas feed to produce the alcohol products.
Figure 4:
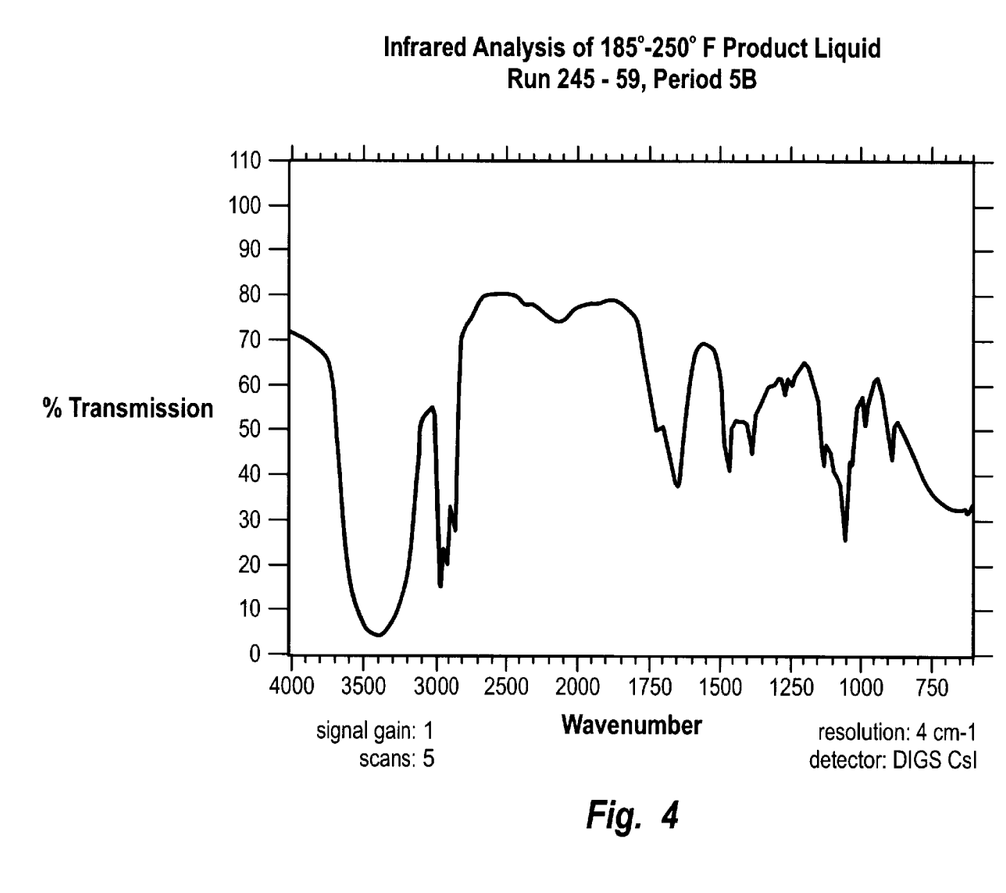
Figure 5:
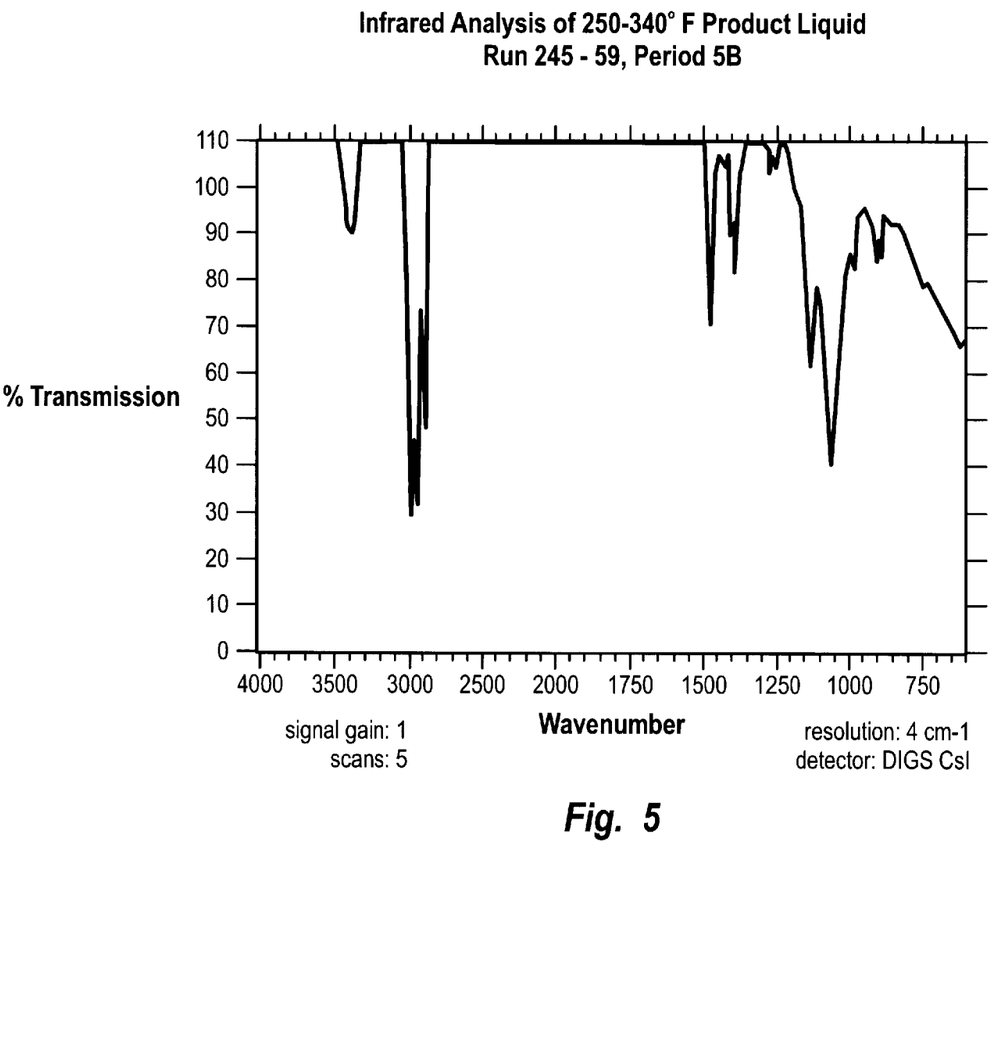

Infra-red analyses for the product liquid fractions IBP-185° F., 185–250° F., 250–340° F. for Run 245-59- period 5B are shown by FIGS. 3, 4 and 5. The liquid fraction boiling above 340° F. is the decalin liquid medium used in the test run. Strong peaks at 3200–3650 wavenumbers are due to alcohols. Strong peaks at 1050–1300 wavenumbers are due to alcohols and ethers. Other peaks at 1340–1470 wavenumbers are due to alkanes, and peaks at 1510–1680 are due to alkenes. Strongest peaks are due to alcohol products. Boiling point analyses show that these alcohols are mostly higher alcohols. Based on these results, it is apparent that the carbonous carbon-coated catalyst made according to this invention was effective in good yields of desired light and heavy alcohol liquid products. An inspection of the catalyst after 120 hours operation revealed no noticeable particle breakage or attrition losses. Accordingly, it is considered that results of these catalytic runs on syngas feedstreams utilizing the carbonous carbon-coated catalyst in the two-stage basket type reactors provided results comparable to results obtainable by utilizing the carbonous catalyst in moving bed reactors such as ebullated/fluidized bed type reactors.

It is understood that for a large commercial scale process utilizing the stable carbonous carbon-coated catalyst of this invention, the autoclave type catalytic reactors 44 and 48 utilized in the FIG. 2 flowsheet would be replaced by larger three-phase upflow ebullated/fluidized bed reactors containing a bed of the carbonous catalyst particles which are placed in rapid random motion within the liquid medium by the upflowing gas and liquid streams.

EXAMPLE 8

Further catalyst activity testing runs were performed on another similar carbonous carbon-coated catalyst composition using the two-stage stirred reactor system described in Example 7. Carbonous Cs-promoted copper-zinc-chromite catalyst was prepared using procedures as in Example 2, and had characteristics of 0.7 mm extrudate diameter, 16.9 wt % carbon, 2.7 lb/mm crush strength, and 94 $m^2$/gm surface area. 80 gm catalyst was charged into each staged reactor of the reactor system depicted by FIG. 2. Syngas feedstream contained $H_2$/CO ratio of 0.75 and 5 vol. % $CO_2$, and the liquid medium was decalin (b.p. 374° F.). Extended operations were conducted at 1500 psig reactor pressure and 620–680° F. first stage reactor temperature and 640–680° F. second stage reactor temperature, and various light and heavy alcohol liquid products were successfully produced. The $C_2$–$C_6$ product distribution results obtained during a 144 hour run are shown in Table 7.

TABLE 7

| $C_2$–$C_6$ Alcohol Product Distribution | |
|---|---|
| Ethanol, w % | 17.8 |
| 1-Propanol, w % | 31.9 |
| 2-methyl 1-propanol, w % | 37.7 |
| 1-Butanol, w % | 6.6 |
| 2-methyl 1-Butanol, w % | 6.0 |

These results are quite similar to those achieved for Example 7 using the Cs-promoted zinc chromite catalyst, with negligible catalyst loss by attrition. The results verify that the Cs-promoted copper-zinc-chromite catalyst can also be successfully used in ebullated/fluidized bed catalytic reactors for producing good yields of both light and heavy alcohol products from syngas feedstreams.

Although this invention has been described broadly and includes preferred embodiments, it will be understood that modifications and variations can be made to the carbonous catalyst composition, method steps need for making the catalyst, and processes for utilizing the catalyst, all as defined within the scope of the following claims.

We Claim:

1. Stable carbonous catalyst particles having improved crush strength and attrition resistance, said catalyst particles comprising an active inorganic catalytic powder and a carbonaceous liquid binder material which after being mixed together then carbonized and partially oxidized at elevated temperature form a basic inner porous carbon coating bonding together the inorganic catalytic powder and providing a substantially uniform composition and structure having increased particle strength and surface area, said catalyst particles having total carbon content of 2–25 wt %, 1.0–5.0 lb/mm crush strength, 50–300 $m^2$/g surface area, and 0.02–0.100 inch (0.51–2.54 mm) diameter particle size.

2. The carbonous catalyst particles of claim 1, wherein said inorganic catalytic powder has size smaller than 200 mesh and includes zinc chromite, cesium-promoted zinc chromite, copper-promoted zinc chromite, and K- and Mn-promoted zirconia powder.

3. The carbonous catalyst particles of claim 1, wherein said carbonaceous liquid binder materials have molecular weight of 200–700 and include partially polymerized furfuryl alcohol, furfuryl alcohol resins, polyvinyl acetate, polyvinyl butates, polyvinyl chlorides, coal-derived hydrocarbon liquid, or waxes from Fischer-Tropsch synthesis process.

4. The carbonous catalyst particles of claim 1, wherein said basic inner carbon coating includes micropores which are created in said basic carbon coating by carbonization in an inert atmosphere at 800–1400° F. temperature for 24 hours, and then partial oxidization at 700–1000° F. temperature for 24 hours for creating said micropores in the basic carbon coating.

5. The carbonous catalyst particles of claim 1, wherein the catalyst particle crush strength is 1.44.5 lb/mm.

6. The carbonous catalyst particles of claim 1, wherein said particles have an extrudate shape and 0.025–0.075 inch (0.63–2:0 mm) diameter.

7. The carbonous catalyst particles of claim 1, wherein said basic inner carbon-coated catalyst particles have a porous outer secondary carbon-coating layer which is carbonized and partially oxidized after a second application of said carbonaceous liquid binder material.

8. Stable carbonous catalyst particles having improved high crush strength and attrition resistance suitable for successful use in ebullated/fluidized bed reactor operations, said catalyst particles comprising cesium-promoted zinc powder having size smaller than 200 mesh and a carbonaceous partially polymerized furfuryl alcohol liquid binder material which after being mixed together and carbonized and oxidized at 700–1400° F. temperature form a basic inner porous carbon coating bonding the catalytic powder together, and including an outer porous carbon-coating layer, said catalyst particles having a total carbon content of 3–20 wt %, 1.4–4.5 lb/mm crush strength, 80–200 $m^2$/g surface area, and an extrudate shape having 0.025–0.080 inch (0.64–2.0 mm) diameter.

9. A method for making stable carbonous catalyst particles containing an inorganic catalytic powder and a porous carbonized binder material, comprising the steps of:
   (a) providing an inorganic catalytic powder and mixing said powder with a suitable carbonaceous liquid binder material having molecular weight of 200–700, and forming a substantially uniform powder-liquid binder mixture having a paste consistency;

(b) forming said powder-liquid binder mixture into shaped soft stable catalyst particles having 0.02–0.100 inch diameter;

(c) heating and first carbonizing said carbonaceous liquid binder material by heating said shaped soft catalyst particles to 800–1400° F. temperature in an inert atmosphere for 1–4 hours and converting the carbonaceous liquid binder to a porous graphite form and thereby basic inner carbon coating said catalytic powder in the shaped carbon-coated particles; and (d) partially oxidizing said carbon-coated particles at 700–1000° F. temperature in a flow of inert gas containing 0.1–5 vol. % concentration oxygen atmosphere for 1–4 hours and forming micropores on the graphitie surface of the stable carbonous carbon-coated catalyst particles.

10. The method for making carbonous catalyst particles according to claim 9, wherein said catalytic powder is zinc chromite, cesium-promoted zinc chromite, copper-promoted zinc chromite, or K- and Mn-promoted zirconia.

11. The method for making carbonous catalyst particles according to claim 9, wherein said carbonaceous liquid binder includes partially polymerized furfuryl alcohol, furfuryl alcohol resins, polyvinyl acetate, or polyvinyl butates.

12. The method for making carbonous catalyst particles according to claim 9, including providing at least one outer carbon coating by applying an outer coating of said carbonaceous liquid binder to said basic shaped inner carbon-coated particles, then carbonizing the outer coating of said carbonaceous liquid binder at 800–1400° F. temperature for 1–4 hours, followed by partially oxidizing the carbon-coated particles to provide the outer porous carbon coating layer.

13. The method for making a carbonous catalyst according to claim 12, wherein said outer coating of said carbonaceous liquid binder is applied to said shaped soft catalyst particles before said first carbonizing step, and including partially oxiding the basic inner and outer carbon coating layer at 700–1000° F. temperature for 2–4 hours and forming micropores in the basic and outer carbon coatings.

14. A method for making stable carbonous catalyst particles containing an inorganic catalytic powder and a porous carbonized binder material, comprising the steps of:

(a) providing an inorganic catalytic powder of cesium-promoted zinc chromite, mixing said catalytic powder with a carbonaceous liquid binder material of partially polymerized furfural alcohol and forming a substantially uniform catalyst powder-binder mixture having a paste consistency;

(b) forming said catalyst powder-binder mixture into shaped soft extrudate particles having 0.025–0.075 inch (0.63–1.90 mm) diameter;

(c) heating said shaped soft extrudate particles and first carbonizing the carbonaceous liquid binder by heating to 800–1350° F. temperature in an inert atmosphere for 2–4 hours and converting the carbonacous liquid binder to a porous graphite form and thereby providing a basic inner carbon coating for said catalytic powder and providing basic inner carbon-coated particles;

(d) partially oxidizing said carbon-coated particles at 700–1000° F. temperature for 2–4 hours duration and forming micropores in the basic inner carbon coating; and (e) providing a subsequent outer carbon coating on said basic inner carbon-coated particles by further contacting said particles with a carbonaceous liquid binder, then carbonizing the outer liquid binder at 800–1400° F. temperature, and followed by heating and partially oxidizing the carbonous particles and providing an outer porous carbon coating layer on the shaped basic inner carbon-coated particles.

* * * * *

UNITED STATES PATENT AND TRADEMARK OFFICE
CERTIFICATE OF CORRECTION

| | | |
|---|---|---|
| PATENT NO. | : 6,906,000 B1 | Page 1 of 3 |
| APPLICATION NO. | : 10/014955 | |
| DATED | : June 14, 2005 | |
| INVENTOR(S) | : Ganguli et al. | |

It is certified that error appears in the above-identified patent and that said Letters Patent is hereby corrected as shown below:

On Title Page Item (57)
Abstract, Line 14, change "1*b*/mn." to --lb/mn.--

Drawings,
Sheet 1, replace Figure 1 as shown below to change one instance of repeated reference number "29" to --30--;

Fig. 1

Sheet 2, replace Figure 2 as shown below to change one instance of repeated reference number "43" to --42-- and one instance of repeated reference number "60" to --64--:

UNITED STATES PATENT AND TRADEMARK OFFICE
CERTIFICATE OF CORRECTION

PATENT NO.       : 6,906,000 B1
APPLICATION NO.  : 10/014955
DATED            : June 14, 2005
INVENTOR(S)      : Ganguli et al.

It is certified that error appears in the above-identified patent and that said Letters Patent is hereby corrected as shown below:

Fig. 2

Column 1,
Line 17, after "process for" insert --utilizing--

Column 3,
Line 16, change "includes:" to --include:--
Line 36, after "weight in" insert --a--
Line 37, before "range of" insert --in a--
Line 60, before first instance of "at least" insert --of--
Line 60, after "at least about" remove "about"
Line 60, after "surface area" insert --of--

Column 4,
Line 10, before "carbon coating" insert --inner--

Column 5,
Line 61, change "products," to --products.--

Column 6,
Line 2, before "desired reaction" insert --a--
Line 2, change "pressure, hydrogen" to --pressure. Hydrogen--
Line 36, change "literl/kg." to --liter feed/kg.--

UNITED STATES PATENT AND TRADEMARK OFFICE
CERTIFICATE OF CORRECTION

PATENT NO. : 6,906,000 B1
APPLICATION NO. : 10/014955
DATED : June 14, 2005
INVENTOR(S) : Ganguli et al.

It is certified that error appears in the above-identified patent and that said Letters Patent is hereby corrected as shown below:

Column 7,
Line 57, change "exceedubg" to --exceeding--

Column 8,
Line 30, change "_alcohol" to --alcohol--

Column 11,
Table 6, line 26, after "GHSV (l/Kg. Cat/hr" insert --)--

Column 14,
Line 2, after "method steps" change "need" to --needed--
Line 32, after "temperature for" change "24" to --2-4--
Line 34, before "hours" change "24" to --2-4--
Line 35, before "carbon coating." insert --inner--
Line 37, change "1.44.5 lb/mm." to --1.4-4.5 lb/mm.--
Line 40, change "(0.63-2:0 mm)" to --(0.63-1.9 mm)--

Column 15,
Line 14, change "graphitie" to --graphitic--

Column 16,
Line 1, change "oxiding" to --oxidizing--
Line 3, after "in the basic" insert --inner--.

Signed and Sealed this

Seventeenth Day of October, 2006

JON W. DUDAS
*Director of the United States Patent and Trademark Office*